VARIATION OF $\sigma_m$ WITH TEMPERATURE

VARIATION OF $\varepsilon_m$ WITH TEMPERATURE

United States Patent Office 3,792,003
Patented Feb. 12, 1974

3,792,003
HYDROXY-TERMINATED POLYBUTADIENE, DIISOCYANATE AND TRIOL COMPOSITION
Gonzague L. Duchesne, 3192 Neuville St., Ste. Foy, Quebec, Canada
Filed Sept. 29, 1971, Ser. No. 184,958
Claims priority, application Canada, Sept. 29, 1970, 94,308
Int. Cl. C08f 27/10, 27/12
U.S. Cl. 260—18 TN                15 Claims

ABSTRACT OF THE DISCLOSURE

An elastomeric composition is formed by mixing a hydroxy terminated polybutadiene formed by reacting a carboxyl terminated polybutaliene with a mono-epoxide with a diisocyanate and a polyoxyalkylene triol. The composition is useful as a binder in forming a castable propellant. It also may be used as a low temperature structural material or as an insulator.

BACKGROUND OF THE INVENTION

Field of the invention

The present invention relates to a castable binder composition and, more particularly, to the use of high molecular weight polymeric triols as cross linking agents for the binder compositions.

Description of the prior art

Polybutadiene propellants having as a binder an elastomer formed from caboxyl terminated polybutadienes, have found ready acceptance in the composite propellant industry because of their desirable mechanical properties. However, these castable rocket propellants have serious drawbacks including in particular a complicated curing system which involves aziridines or epoxides either alone or in combination. This curing system with which the carboxyl groups of the polybutadiene react to produce amide links when tris(2 - methylaziridinyl) - phosphine oxide (MAPO) is the cross linking agent, or ester links when polyepoxides are the cross linking agents, requires a curing time of up to two weeks. In addition to the long period of curing which is necessary to obtain propellants of fair quality, the aziridine has many drawbacks as it is toxic and has a tendency to degrade when subjected to prolonged heating, high relative humidity or hot conditions. It also tends to post-cure, thus increasing the modulus of the binder and the porpellants resulting therefrom. Thus, the propellant has relatively poor aging characteristics when exposed to high temperature storage. Further, variations of the polymer properties from one batch to the other with the aforesaid system are found to occur. While attempts have been made to overcome these and other drawbacks in the above curing system there are still many problems with the polybutadiene propellants based on carboxyl terminated polybutadiene.

A particularly advantageous hydroxy terminated polybutadiene for use in a binder of a castable solid rocket propellant is disclosed in related application Ser. No. 184,-757. In that case there is disclosed hydroxy telechelic polybutadiene and, in particular, hydroxy terminated polybutadienes, desirably rich in cisisomer and obtained by the reaction of a mono epoxy compound and the corresponding carboxy polymers. The term "hydroxy terminated" means a polymer having hydroxyl groups including primary and secondary hydroxyl groups attached adjacent the ends of the polymer molecule and preferably at the ends of the molecule. The mono epoxy compound may be any organic compound containing a single epoxy group including mono epoxy resins. Particularly preferred are epoxy compounds of the formula:

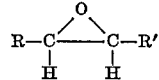

wherein each of R and R' is hydrogen, or alkyl containing 1–6 carbon atoms. In particular, the epoxy compounds are 1,2-alkylene oxides such as propylene oxide and 1,2-butylene oxide which produce secondary hydroxyl groups when reacted with the carboxyl telechelic polymer. The preparation of these polymers is also set forth in related application Ser. No. 184,757 and involves reaction of the epoxide with the carboxy telechelic polymer; particularly that supplied under the trademark HC434 by Thiokol Chemical Corporation or that supplied under the Trademark HYCAR CTP supplied by B. F. Goodrich Company.

A typical molecule of the hydroxyl terminated polybutadiene (PB/BO) rich in cis-isomer is prepared by reaction of a large molar excess of propylene oxide with a carboxyl terminated polybutadiene rich in cis-isomer and having a molecular weight range between about 3000 and 4000. A preferred polybutadiene is that supplied under the Trademark HC434 which has a molecular weight of about 3,800 and is belived to have the following formula:

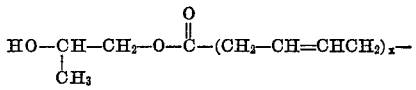

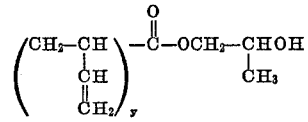

wherein x and y each vary between 1 and 67.

The hydroxyl terminated polybutadiene (PB/BO) when butylene oxide is the alkylene oxide has been found by hydroxyl determination to have a molecular weight of about 3,400 and by vapor phase osmometer determination 3,630.

According to a particular embodiment of the invention set forth in related application Ser. No. 184,757, filed Sept. 29, 1971, the elatsomeric binder for use in forming a castable propellant comprises a hydroxy telechelic polymer, such as set forth heretofore, a diisocyanate such as propylene diisocyanate, and a triol cross linking agent. The solid polybutadiene propellant comprises such elastomeric binder having dispersed therethrough finely divided ammonium perchlorate as oxidizer and finely divided aluminum, the solids being present in an amount of about 80 to 86% by weight and preferably at least 84% by weight. The triol cross linking agent as set forth in the aforesaid parent application should be a compatible triol cross linking agent and a particularly advantageous triol cross linking agent, as set forth in that application, is one which is a tris hydroxy terminated polyhydrocarbon which is the reaction product of a tris(carboxy terminated)polyhydrocarbon and the aforesaid mono epoxy compound. The tris(carboxyl terminated)polyhydrocarbon is suitably a triacid supplied under the Trademark EMPOL 1040 by Emery Industries, Inc. and is obtained by the polymerization of unsaturated $C_{18}$ fatty acids and is essentially a mixture of tri- and diacids, approximately 90% and 5% respectively and residual monobasic acid, the triacid portion being 54 carbon tribasic acids having a molecular weight of 845. EMPOL 1040 has an acid value of 0.214 equivalents per 100 grams and a viscosity of 1790 centistokes at 75° C.

The tris hydroxy terminated polyhydrocarbon is obtained by reacting the tris carboxy terminated polyhydrocarbon under superatmospheric pressure with the epoxide compound.

The structure of the tris(hydroxy terminated) polyhydrocarbon obtained by the reaction of EMPOL 1040 with propylene oxide (EMPOL/PO) may be represented as follows:

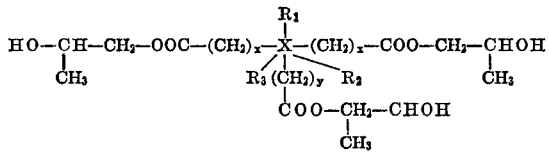

In the above formula $R_1$, $R_2$, and $R_3$ are believed to be alkyl side chains and $x$ are linkages resulting from the polymerization of three unsaturated fatty acid molecules. The molecular weight of the triol (EMPOL/BO) when the alkylene oxide is 1,2-butylene oxide was found by hydroxyl determination to be 1260 and by vapor osmometer determination to be about 1130.

To form the castable propellant the binder before curing thereof is admixed with finely divided ammonium perchlorate, preferably of particle size 400 microns and 200 microns and finely divided aluminum as fuel, preferably of the spherical type having a particle size of about 15 microns. The polymer so obtained preferably should have a minimum of 80% loading and more preferably 84% solid loading. To facilitate mixing of the binder with the solids to produce the solid propellant with an 84% solid load, the binder includes a plasticizer such as bis(2-ethylhexyl)azelate( DEHA), suitably in amount from about 10 to 20% which lowers the viscosity of the paste formed. A high percentage by weight of the plasticizer usually lowers the tensile strength of the propellant. Thus, the castable propellant is prepared by mixing the hydroxy telechelic polymer, the tris hydroxy terminated polyhydrocarbon and the plasticizer and the diisocyanate and the mixture is stirred into a homogeneous liquid. The solids, i.e. the finely divided ammonium perchlorate and the finely divided aluminum, are carefully blended in a weight ratio range from 70:30 to 90:10 perchlorate to aluminum. The preferred optimum weight ratio of perchlorate to aluminum is 82 to 18. For good mixing the binder mixture is added to the blended solid and stirred under vacuum in a resin pot until mixing is completed. With an 80% solid load, room temperature mixing is adequate but with an 84% solid load, a temperature 50 to 60° C. is necessary to increase fluidity. When the mixing is over, the propellant mix is poured into Teflon trays and cured at 60° C. over about 3 days. To substantially reduce the pot life and curing time of the binder, small amounts, 0.001% up to about 0.2% of a curing catalyst, such as ferric acetylacetonate (FeAA) is present. By adjusting the level of the catalyst, the pot life of the binder and propellant can be varied considerably and the reactivity can be brought to a level where it is possible to process the binder with the same equipment used normally in the production of polyurethane. Thus the binder of related application Ser. No. 184,757 eliminates the long cure and resulting drawback of tied-up facilities experienced with the use of carboxyl terminated polybutadienes in the binder system. Further, this binder system has the advantage of using readily available materials which are transformed quantitatively and easily without going through an aqueous system. The physical properties of the binder and the propellant are similar to those of the known carboxyl terminated polybutadiene systems.

The mechanical properties of the binder system can be much improved, especially at low temperatures, by incorporating a small amount of wetting agent to increase the bonding between the particulate solids and the elastomeric binder. Such wetting agents include a polymer made from N-ethyldiethanol-amine and sebacic acid supplied under the trademark Polymer N-8, and a polymer supplied under the trademark Methyl B. This is similar to N-8 excet for the residual carboxyl groups which, after reaction with propylene oxide in a pressure vessel, are converted to hydroxyl groups. An amount from 0.3 to 0.8% by weight of the binder is found to be compatible with the binder.

While the mechanical properties at room temperature of the hydroxy terminated polybutadiene propellant disclosed and claimed in the parent case are excellent and quite comparable with those of the known carboxy terminated polybutadiene propellants at room temperature, these propellants show rather low elasticity at low temperature, e.g. in the range —40 to —65° F. and it is well recognized that the ideal propellant binder should exhibit high elongation over a wide temperature range. This is particularly the case with these castable propellants because of the stresses induced during temperature variation on storage, In particular, as will be shown hereinafter, while the hydroxy terminated polybutadiene castable propellant disclosed and claimed in related application Ser. No. 184,757 yields excellent mechanical properties at room temperature with a tensile strength greater than 100 p.s.i. and elongations as high as 60 to 90%, at low temperatures the elongations were low (varying between 10 and 20% at —65° F.). A good carboxyl terminated polybutadiene propellant shows a 50 to 60% elongation at the same temperature and at the same solids load.

SUMMARY OF THE INVENTION

According to the present invention there is provided a curable mixture comprising a hydroxy terminated polybutadiene, a diisocyanate and a high molecular weight polyoxyalkylene triol. When appropriate oxidizers and fuels are added to the mixture, a particularly desirable castable propellant results having improved elasticity at low temperatures. The low temperature tensile strength is also improved in accordance with the present invention by including a low molecular weight triol with the heavier polyoxyalkylene triol as curing agents.

Other features and attendant advantages of the present invention will become apparent to those skilled in the art from a reading of the following detailed description taken in conjunction with the accompanying drawings wherein:

DESCRIPTION OF THE PREFERRED EMBODIMENT

Figure 1:
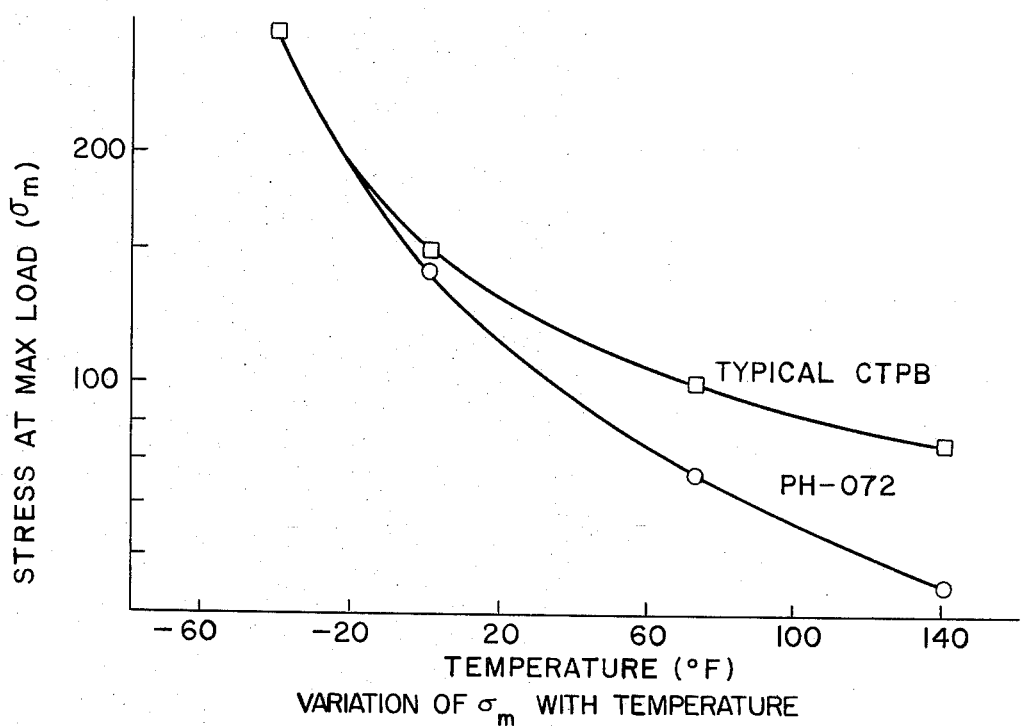
FIG. 1 is a graph of stress at maximum load against temperature for a conventional carboxy terminated polybutadiene propellant compared with a hydroxy terminated polybutadiene propellant according to one embodiment of the present invention.

The curable mixture of the present invention comprises a hydroxy terminated polybutadiene which is the reaction product of a carboxyl terminated polybutadiene and a mono epoxide, a diisocyanate, and a triol cross linking agent. Preferably, the triol is a polyoxyalkylene triol having a molecular weight between about 3500 and 4500, such as a polyoxypropylene or polyoxyethylene triol. In particular, the triol is desirably a liquid polyoxypropylene triol which is a polyoxypropylene derivative of propylene glycol trimethylol propane or glycerine. A preferred triol has a molecular weight of about 4040 and is supplied under the name Pluracol 4040 by Wyandotte Chemical Corporation. While the complete substitution in the curable mixture of the tris hydroxy terminated polyhydrocarbon (set forth in related application Ser. No. 184,757) by the high molecular weight hydrocarbon triol (according to the present invention) improves the elongation at low temperature, it is found that the tensile strength of the propellant at room temperature is disadvantageously affected and becomes marginal as will be shown hereinafter. Therefore, according to a preferred embodiment of the present invention it has been found that the presence of both the relatively low molecular weight triol, i.e. the tris hydroxy terminated polyhydrocarbon which is a reaction product of a tris carboxy terminated polyhydrocarbon and a mono epoxide as set forth in related application Ser. No. 184,757 and the high molecular weight polymeric triol, such as Pluracol 4040, desirably in a ratio of about 2:1 by weight, provides good tensile strength at room temperature and good elongation at low temperature, e.g. −65° F. The ratio of the two triols may be varied according to the mechanical properties required for a specific application. The cross linking agent is suitably present in an amount from about 1.5 to about 7% by weight of the binder. The low molecular weight triol is suitably present in the binder in an amount from 0.5 to 2.0 percent by weight and the high molecular weight triol is present in an amount from 1.5 to 5.0% by weight.

Another embodiment of the present invention includes the castable propellant formed with said binder which includes solids in amount of from 80 to 88% by weight, preferably 80 to 86% by weight and more preferably 84 to 86% by weight. The solids comprise ammonium perchlorate suitably containing two commercial grades of 400 and 200 micron average diameter and a pulverized grade having an average diameter of 17 microns. For high concentrations of solids of 86 to 88%, spheroidal grades of ammonium perchlorate are suitable to improve processability. Aluminum powder is also present and whereas the ammonium perchlorate comprises 60 to 70% of the propellant, the aluminum powder comprises 10 to 22% of the propellant. The propellant also desirably contains the wetting agent, plasticizer and curing catalyst set forth in related application Ser. No. 184,757, filed Sept. 29, 1971.

In forming the curable mixture of the present invention, the equivalent weight ratio (R) of isocyanate to total hydroxyl content may vary from 0.7 to 1.5. The equivalent weight ratio ($\rho_t$) of triol hydroxy to total hydroxy can vary between 0.050 to 0.420. To ensure adequate wetting of the ammonium perchlorate particles by the binder and good dispersion of the ingredients, the liquid ingredients i.e. the telechelic polymer, the triol cross linking agent, the wetting agent, the catalyst and the plasticizer are premixed. To promote accuracy in mixing the small amount of catalyst, it is added as a dilute solution in benzene. Aluminum powder is then added and the mixture is agitated until all the aluminum particles are wetted. A vacuum is then applied and the ingredients are heated to a temperature of 140° F. mixed together for 10 minutes such that the catalyst is well dispersed throughout the mixture, and the benzene is removed. The vacuum is then released and two-thirds of the ammonium perchlorate are added and the mixture agitated for two more minutes. The balance of the ammonium perchlorate is then added and the mixture is agitated for a further two minutes. The ingredients are then mixed under vacuum at 140° F. for forty minutes and once again the vacuum is released, the diisocyanate is added, and agitator is rotated for five minutes. The vacuum is then again applied, mixing continued for 40 more minutes at 140° F. and the propellant is then cast into the mold under vacuum.

A series of 10 lb. hydroxy terminated polybutadiene binder mixtures prepared as follows:

EXAMPLE 1

A series of binder mixes were prepared having compositions as set forth in the following Table I.

TABLE I

| Mixed number | PH-050 | PH-051 | PH-052 | PH-054 | PH-055 | PH-056 | PH-057 |
|---|---|---|---|---|---|---|---|
| (1) R | .994 | .95 | .95 | .95 | .95 | .95 | .95 |
| (2) $\rho_t$ | .107 | .107 | .107 | .107 | .107 | .054 | .054 |
| (3) OH EMPOL/BO | .107 | .107 | .107 | .107 | .107 | .054 | .054 |
| (4) OH Pluracol | | | | | | | |
| Percent by weight: | | | | | | | |
| PB/BO | 80.503 | 80.702 | 80.696 | 80.696 | 74.913 | 76.223 | 76.223 |
| EMPOL/BO | 2.343 | 2.349 | 2.349 | 2.349 | 2.181 | 1.049 | 1.049 |
| Pluracol 4040 | | | | | | | |
| N-8 | .300 | .300 | .300 | .300 | .300 | .300 | .300 |
| FeAA | .023 | | .006 | .006 | .006 | .006 | .006 |
| DEHA | 12.500 | 12.500 | 12.500 | 12.500 | 18.750 | 18.750 | 18.750 |
| TDI | 4.331 | 4.149 | 4.149 | 4.149 | 3.851 | 3.672 | 3.672 |
| Methyl B | | | | | | | |

Note.—(1) R=NOC/OH total. (2) $\rho_t$=OH triols/OH total. (3) contribution of EMPOL/BO to OH triols. (4) Contribution of Pluracol to OH triols.

The binder mix in each case was prepared by admixing the PB/BO polymer, the EMPOL/BO cross linking agent, the N-8 wetting agent, the DEHA plasticizer and the FeAA catalyst in dilute solution in benzene.

To each binder mix was admixed 18% by weight spheroidal aluminum (15 microns average diameter) and 66% by weight of a toroidal blend ammonium perchlorate (400, 200, and 17 micron material in the ratio 2:1:0.5).

In particular, the aluminum powder was added to the mix which was then agitated until all the aluminum particles were wetted. A vacuum was then applied and the mix heated to a temperatrue of 140° F. and mixed together for 10 minutes whereby the catalyst became well dispersed throughout the mixture and the benzene was removed. The vacuum was then released and two portions of the ammonium perchlorate were added and the mixture agitated for two more minutes. The balance of the ammonium perchlorate was then added and the mix-

TABLE II

| Mix number | PH-050 | PH-051 | PH-052 | PH-054 | PH-055 | PH 056 | PH-058 |
|---|---|---|---|---|---|---|---|
| 73° F.: | | | | | | | |
| $\tau_m$ (p.s.i.) | 182.3 | 137.1 | 141.6 | 161 | 135 | 109.3 | 145.6 |
| $\epsilon_m$ (percent) | 15.5 | 62.9 | 70.9 | 32.9 | 64.7 | 98.8 | 86.5 |
| E (p.s.i.) | 2,314 | 1,000 | 1,107 | 1,811 | 950 | 769 | 1,015 |
| −40° F.: | | | | | | | |
| $\tau_m$ (p.s.i.) | 383.8 | 381.8 | 361.2 | 411.7 | 326.5 | 330 | 354.2 |
| $\epsilon_m$ (percent) | 16.8 | 22.2 | 37.0 | 22.4 | 40.7 | 62.4 | 38.4 |
| E (p.s.i.) | 5,845 | 6,721 | 5,935 | 7,375 | 5,052 | 5,731 | 5,796 |
| −65° F.: | | | | | | | |
| $\tau_m$ (p.s.i.) | 486.3 | 553.8 | 523.3 | 553 | 438.4 | 509.4 | 498 |
| $\epsilon_m$ (percent) | 15.1 | 12.3 | 16.3 | 12.0 | 21.5 | 16.4 | 20.0 |
| E (p.s.i.) | 7,744 | 10,683 | 8,908 | 11,042 | 7,688 | 10,135 | 8,666 |

Note.—$\tau_m$=Tensile strength at maximum load. $\epsilon_m$=Elongation at maximum load. E=Initial modulus.

ture was agitated for two more minutes. The mix was then agitated under vacuum at 140° F., for forty minutes and the vacuum then released and the diisocyanate added with subsequent agitation for five minutes. The vacuum was then again applied and mixing was continued for forty more minutes at 140° F. and the propellant cast into Teflon (a trademark) coated boxes and cured for seven days at 140° F. Sample blocks were cut into slabs and machined to a thickness of 0.500±0.020 inch. JANAF dog bone test specimens were die-cut for the machined slabs and tested uniaxially in tension on the Instore machine at temperatures varying from −65° F., −40° F., 0° F., 73° F. and 140° F. The strain rate was 2″ per minute for all the specimens.

The results obtained at the temperatures 73° F., −40° F., −40° F. and −65° F. are given in Table II.

It will be seen from Table II that at room temperature (73° F.) the propellant which contained only EMPOL/BO as cross linking agent exhibited excellent mechanical properties with a tensile strength greater than 100 p.s.i. This is normal for conventional carboxy terminated polybutadiene propellants. At a low temperature of −65° C. the elongations were unsatisfactory, varying between 10 and 20% in contrast to conventional carboxy terminated polybutadiene propellants which show 50 to 60% elongation at such temperatures for the same solids load.

EXAMPLE 2

In a similar manner to Example 1 a series of propellants were made as follows:

A series of mixes were made up as in Example 1 containing the compositions set forth in Table III.

84.08% HC-434 polymer, 12.50% dioctyl adipate plasticizer, 2.04% MAPO, 0.69 EPLA and 0.69% cross linking oleate catalyst. The ingredients were agitated in a 50 lb. temperature mixer for 80 minutes at 150° under vacuum. During the course of said mixing 18% aluminum and 66% ammonium perchlorate based on the weight of the composition given above, were added to provide 84% solids. The samples were cast under vacuum and tested as above.

EXAMPLE 3

In a similar manner to Example 1 a series of castable propellants were prepared in which the binder had the composition given in Table V.

TABLE V

| Mix number | PH-085 | PH-086 | PH-100 | PH-104 | PH-106 |
|---|---|---|---|---|---|
| (1) R | 1.02 | 1.02 | 1.02 | 1.02 | 1.02 |
| (2) $\rho_t$ | .09 | .09 | .09 | .09 | .09 |
| (3) OH EMPOL/BO | .03 | .06 | .03 | .06 | .06 |
| (4) OH Pluracol | .06 | .03 | .06 | .03 | .03 |
| Percent by weight: | | | | | |
| PB/BO | 73.393 | 74.488 | 73.393 | 74.488 | 68.740 |
| EMPOL | .491 | .997 | .491 | .997 | .92 |
| Pluracol 4040 | 3.363 | 1.707 | 3.363 | 1.707 | 1.570 |
| N-8 | .300 | .300 | | | .300 |
| FeAA | .009 | .009 | .009 | .009 | .009 |
| DEHA | 18.750 | 18.750 | 18.750 | 18.750 | 25.000 |
| TDI | 3.694 | 3.749 | 3.694 | 3.749 | 3.460 |
| Methyl B | | | .300 | .300 | |

NOTE.—(1) R=NCO/OH total. (2) $\rho_t$=OH triols/OH total. (3) Contribution of EMPOL/BO to OH triols. (4) Contribution of Pluracol to OH triols.

TABLE III

| Mix number | PH-072 | PH-076 | PH-078 | PH-079 | PH-080 | PH-081 | PH-083 | PH-084 |
|---|---|---|---|---|---|---|---|---|
| (1) R | 1.00 | 1.00 | 1.05 | 1.00 | 1.05 | 1.02 | 1.02 | 1.02 |
| (2) $\rho_t$ | .054 | .12 | .09 | .09 | .06 | .09 | .09 | .09 |
| (3) OH EMPOL/BO | | | | | | | | |
| (4) OH Pluracol | .054 | .12 | .09 | .09 | .06 | .09 | .09 | .09 |
| Percent by weight: | | | | | | | | |
| PB/BO | 74.115 | 70.638 | 72.233 | 72.393 | 73.951 | 72.329 | 72.326 | 72.329 |
| EMPOL/BO | | | | | | | | |
| Pluracol 4040 | 3.288 | 6.695 | 4.965 | 4.976 | 3.281 | 4.972 | 4.972 | 4.972 |
| N-8 | .300 | .300 | .300 | .300 | .300 | .300 | .300 | .300 |
| FeAA | .006 | .012 | .009 | .009 | .009 | .009 | .012 | .009 |
| DEHA | 18.750 | 18.750 | 18.750 | 18.750 | 18.750 | 18.750 | 18.750 | 18.750 |
| TDI | 3.541 | 3.605 | 3.743 | 3.572 | 3.709 | 3.640 | 3.640 | 3.640 |
| Methyl B | | | | | | | | |

NOTE.—(1) R=NCO/OH total. (2) $\rho_t$=OH triols/OH total. (3) Contribution of EMPOL/BO to OH triols. (4) Contribution of Pluracol to OH triols.

The propellants were made up from the binders as in Example 1 and tested in a similar manner as in Example 1. The results obtained are given in Table IV.

The mechanical testing was conducted as in Example 1 and the results obtained are given in Table VI.

TABLE IV

| Mix number | PH-072 | PH-076 | PH-078 | PH-079 | PH-080 | PH-081 | PH-083 | PH-084 |
|---|---|---|---|---|---|---|---|---|
| 73° F.: | | | | | | | | |
| $\tau_m$ (p.s.i.) | 75.1 | 128.5 | 151 | 58.7 | 155.1 | 53.5 | 153.1 | 113.2 |
| $\epsilon_m$ (percent) | 114 | 90.7 | 40.7 | 119.7 | 83.8 | 120.2 | 42.1 | 115.7 |
| E (p.s.i.) | 497 | 890 | 1,553 | 432.5 | 1,227 | 309 | 1,509 | 771 |
| −40° F.: | | | | | | | | |
| $\tau_m$ (p.s.i.) | 306 | 352.7 | 359.7 | 307.1 | 363.9 | 258 | 363.8 | 355.8 |
| $\epsilon_m$ (percent) | 142 | 93.9 | 45.3 | 147.7 | 78.5 | 158.4 | 42.5 | 130.3 |
| E (p.s.i.) | 6,394 | 6,738 | 6,720 | 6,164 | 5,891 | 4,479 | 5,000 | 5,542 |
| −65° F.: | | | | | | | | |
| $\tau_m$ (p.s.i.) | 505 | 541.6 | 534.3 | 528.2 | 535.7 | 497.9 | 512 | 514.9 |
| $\epsilon_m$ (percent) | 55.3 | 24.9 | 22.2 | 66.3 | 24.3 | 81.4 | 22.1 | 38.3 |
| E (p.s.i.) | 9,672 | 11,768 | 9,932 | 10,102 | 9,114 | 8,228 | 7,744 | 10,400 |

NOTE.—$\tau_m$=Tensile strength at maximum load. $\epsilon_m$=Elongation at maximum load. E=Initial modulus.

Figure 2:
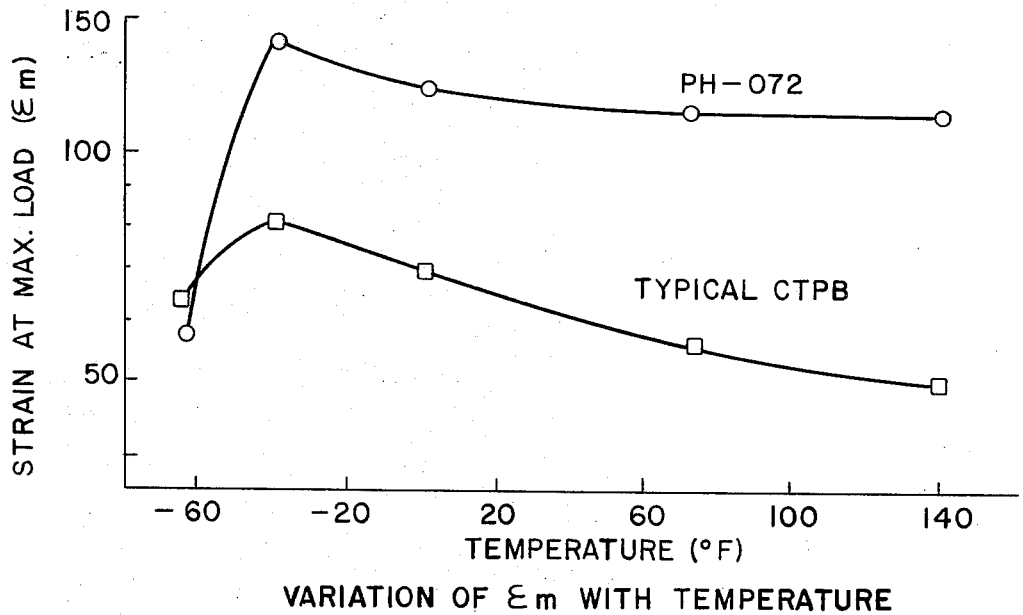
FIG. 2 is a graph showing variation of the strain at maximum load with temperature for the same two propellants.

It will be seen from Table IV that the propellants which contain only Pluracol 4040 as cross linking agent exhibited improved elongation at −65° F. but the tensile strength at room temperature was substantially reduced. This is clearly illustrated in FIGS. 1 and 2 of the accompanying drawings in which, respectively, the stress and strain variation with temperature for a particular propellant (PH 072) are plotted and compared with a similar stress-strain variation using an excellent carboxy terminated polybutadiene propellant.

This carboxy terminated butadiene propellant (CTPB) was prepared by mixing a binder composition comprising

TABLE VI

| Mix number | PH-085 | PH-086 | PH-100 | PH-104 | PH-106 |
|---|---|---|---|---|---|
| 73° F.: | | | | | |
| $\tau_m$ (p.s.i.) | 113.5 | 92.1 | 92.6 | 112.8 | 126.4 |
| $\epsilon_m$ (percent) | 111.6 | 120.8 | 112.4 | 95.6 | 76.9 |
| E (p.s.i.) | 790 | 588 | 665 | 684 | 738 |
| −40° F. | | | | | |
| $\tau_m$ (p.s.i.) | 357.7 | 326.7 | 351 | 366.6 | 330.2 |
| $\epsilon_m$ (percent) | 124.2 | 126.3 | 136 | 118.7 | 115.4 |
| E (p.s.i.) | 7,599 | 4,697 | 8,190 | 6,822 | 3,943 |
| −65° F.: | | | | | |
| $\tau_m$ (p.s.i.) | 500 | 476.8 | 513.4 | 491.6 | 410.7 |
| $\epsilon_m$ (percent) | 70.0 | 85.4 | 73.5 | 74.6 | 66.8 |
| E (p.s.i.) | 9,833 | 7,166 | 12,011 | 10,921 | 6,339 |

NOTE.—$\tau_m$=Tensile strength at maximum load. $\epsilon_m$=Elongation at maximum load. E=Initial modulus.

Figure 3:
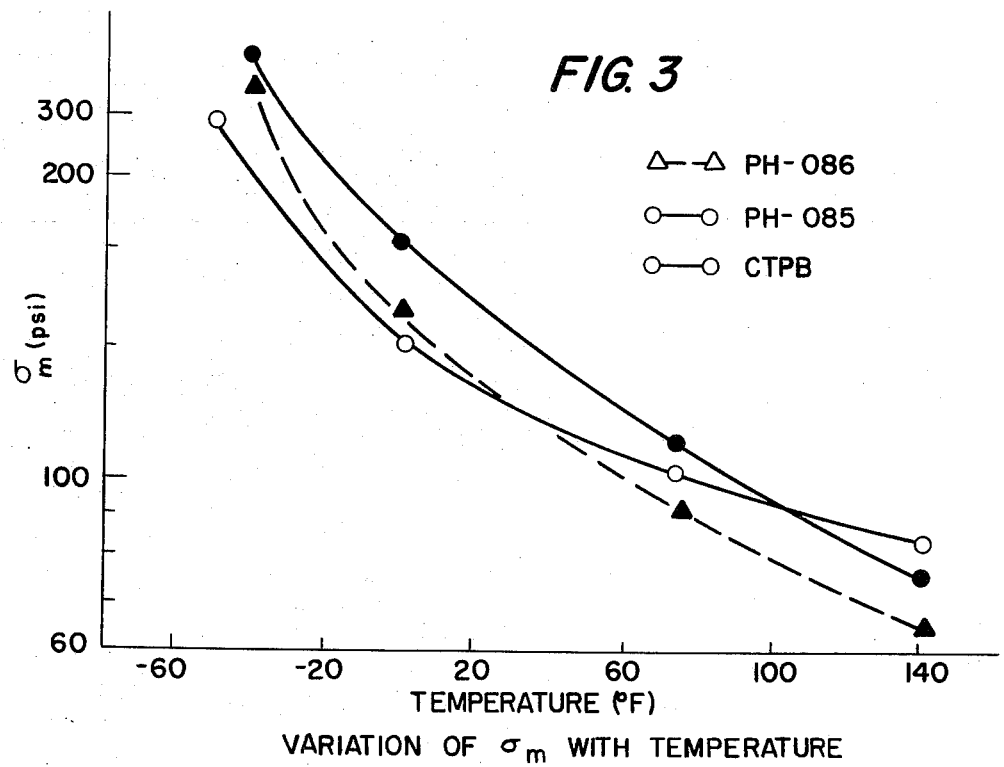
FIG. 3 is a graph showing the variation of stress at miximum load with temperature for a conventional carboxyl terminated polybutadiene propellant and two different hydroxy terminated polybutadiene propellants according to another embodiment of the present invention.
Figure 4:
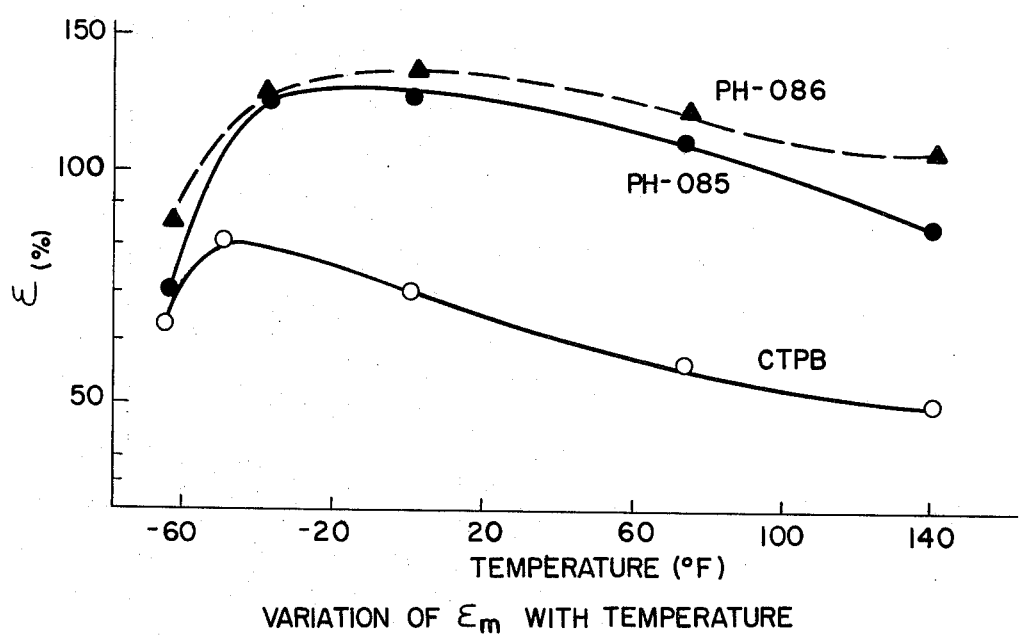
FIG. 4 is a graph showing the variation of strain at maximum load with temperature for the same propellants as in FIG. 3.

It will be seen from Table VI and FIGS. 3 and 4 that both the mechanical properties at room temperature and a temperature of $-65°$ F., are good with the cured mixture which contains both the Pluracol 4040 and the EMPOL/BO.

Obviously many modifications and variations of the present invention are possible in light of the above teachings. It is therefore to be understood that within the scope of the appended claims the invention may be practiced otherwise than as specifically described.

What is claimed an desired to be secured by Letters Patent of the United States is:

1. A curable mixture comprising:
   (a) a hydroxy terminated polybutadiene which is the reaction product of a carboxyl terminated polybutadiene and a mono-epoxide at 110° to 150° C.;
   (b) a diisocyanate; and,
   (c) a polyoxyalkylene triol, wherein the equivalent weight ratio of isocyanate to total hydroxyl content in the mixture varies between about 0.7 and 1.5 and the equivalent weight ratio of triol hydroxy to total hydroxy groups in the mixture varies between about 0.050 to 0.420.

2. The mixture of claim 1 wherein the mono-epoxide comprises an alkylene oxide of the formula

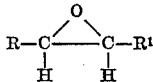

wherein each of R and R¹ is hydrogen or an alkyl radical containing from 1 to 6 carbon atoms.

3. The mixture of claim 2 wherein the alkylene oxide is selected from the group consisting of propylene oxide and butylene oxide.

4. The mixture of claim 1 wherein the carboxyl terminated polybutadiene has a molecular weight between about 3000 and 4000.

5. The mixture of claim 1 wherein the diisocyanate is tolylene diisocyanate.

6. The mixture of claim 2 including 10–20 weight percent bis(2-ethylhexyl) azelate; 0.3–0.8 weight percent of a polymer made from N-ethyldiethanolamine and sebacic acid; and 0.001–0.200 weight percent ferric acetylacetonate.

7. The mixture of claim 1 wherein said triol has a molecular weight between 3500 and 4500.

8. The mixture of claim 7 wherein said triol is selected from the group consisting of polyoxypropylene triol and polyoxyethylene triol.

9. A curable mixture comprising:
   (a) a hydroxy terminated polybutadiene which is the reaction product of a carboxyl terminated polybutadiene and a mono-epoxide at 110° to 150° C.;
   (b) a diisocyanate, wherein the equivalent weight ratio of isocyanate to total hydroxyl content varies between 0.7 and 1.5; and,
   (c) a cross linking agent consisting of
      (i) about 0.5–2.0%, by weight of the mixture, of the reaction product of a trimer acid obtained by the polymerization of an unsaturated $C_{18}$ fatty acid, and an alkylene oxide of the formula

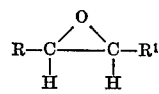

wherein each of R and R¹ is hydrogen or an alkyl radical containing from 1 to 6 carbon atoms; and,
      (ii) about 1.5 to 5.0%, by weight of the mixture, of a polyoxyalkylene triol having a molecular weight between 3500 and 4500.

10. The mixture of claim 9 wherein the mono-epoxide of
   (a) comprises an alkylene oxide of the formula

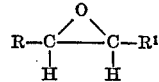

wherein each of R and R¹ is hydrogen or an alkyl radical containing from 1 to 6 carbon atoms.

11. The mixture of claim 10 wherein the alkylene oxide is selected from the group consisting of propylene oxide and butylene oxide.

12. The mixture of claim 10 wherein the carboxyl terminated polybutadiene has a molecular weight between about 3000 and 4000.

13. The mixture of claim 9 wherein the diisocyanate is tolylene diisocyanate.

14. The mixture of claim 10 including 10–20 weight percent bis(2-ethylhexyl) azelate; 0.3–0.8 weight percent of a polymer made from N-ethyldiethanolamine and sebacic acid; and 0.001–0.200 weight percent ferric acetylacetonate.

15. The mixture of claim 9 wherein said triol is selected from the group consisting of polyoxypropylene triol and polyoxyethylene triol.

References Cited

UNITED STATES PATENTS

| | | | |
|---|---|---|---|
| 3,649,389 | 3/1972 | Barron | 149—19 |
| 3,245,849 | 4/1966 | Klager et al. | 149—19 |
| 3,248,348 | 4/1966 | Piechata et al. | 260—22 TN X |
| 3,578,624 | 5/1971 | Cluff | 260—94.7 A X |
| 3,607,976 | 9/1971 | Hsieh | 260—77.5 AM X |
| 3,609,110 | 9/1971 | Kumanotani | 260—94.7 A X |
| 3,625,921 | 12/1971 | Wooster et al. | 260—18 TN X |

FOREIGN PATENTS

| | | | |
|---|---|---|---|
| 720,855 | 11/1965 | Canada | 260—22 TN |

CARL D. QUARFORTH, Primary Examiner

E. A. MILLER, Assistant Examiner

U.S. Cl. X.R.

149—19; 260—31.8 A, 77.5 AM, 77.5 AP, 94.7 A, 94.7 N